United States Patent
Adir et al.

(10) Patent No.: US 7,386,521 B2
(45) Date of Patent: Jun. 10, 2008

(54) AUTOMATIC TEST PROGRAM GENERATION USING EXTENDED CONDITIONAL CONSTRAINT SATISFACTION

(75) Inventors: Allon Adir, Kiryat Tivon (IL); Eyal Bin, Haifa (IL); Roy Emek, Tel Aviv-Jaffa (IL); Kirill Shoikhet, Haifa (IL)

(73) Assignee: Intranational Business Machines Corporation, Armonk, NY (US)

( * ) Notice: Subject to any disclaimer, the term of this patent is extended or adjusted under 35 U.S.C. 154(b) by 589 days.

(21) Appl. No.: 11/040,241

(22) Filed: Jan. 21, 2005

(65) Prior Publication Data

US 2006/0184468 A1    Aug. 17, 2006

(51) Int. Cl.
*G06F 15/18* (2006.01)
(52) U.S. Cl. .............................. 706/14; 706/45; 706/46
(58) Field of Classification Search .................. 706/14, 706/45, 46
See application file for complete search history.

(56) References Cited

U.S. PATENT DOCUMENTS 5,617,510 A * 4/1997 Keyrouz et al. ............... 706/45
5,636,328 A * 6/1997 Kautz et al. .................. 706/45
7,266,534 B2 * 9/2007 Emek et al. ................... 706/45
2007/0100781 A1 * 5/2007 Geller et al. .................. 706/46

OTHER PUBLICATIONS

Allon Adir et al., Genesys-Pro: Innovations in Test Program Generation for Functional Processor Verification, 2004, IEEE, 84-93.*
Vipin Kumar, Algorithms for Constraint-Satisfaction Problems: A Survey, Spring1992, Al Magazine, 32-44.*
E. Bin et al., Using a constraint satisfaction formulation and solution techniques for random test generation, IBM, Mar. 2002, 1-18.*
Brian Falkenhainer et al., Compositional Modeling of Physical Systems, Xerox, 1-15.*
Sanjay Mittal et al., Dynamic Constraint Satisfaction Problems, Jul. 1990, Xerox, 25-32.*
Jose Luis Ambite, Conditional Constraint Networks for Interleaved Planning and Information Gathering, 2005, IEEE, 25-33.*

* cited by examiner

*Primary Examiner*—Joseph P Hirl

(57) ABSTRACT

A method for automatically generating test programs includes receiving a description of a system under test, expressed in terms of variables associated with the system and conditional constraints including semantics applied to the variables, and receiving a definition of an event to be tested in the system. The method generates an ECondCSP over the variables responsively to the definition of the event and to the conditional constraints, such that at least some of the semantics of the conditional constraints are preserved in the ECondCSP when one or more of the variables to which the semantics are applied are inactive. The ECondCSP is solved to generate a test case for the system.

40 Claims, 4 Drawing Sheets

AUTOMATIC TEST PROGRAM GENERATION USING EXTENDED CONDITIONAL CONSTRAINT SATISFACTION

FIELD OF THE INVENTION

The present invention relates generally to constraint satisfaction problems, and specifically to methods and systems enabling automatic test program generation using conditional constraint satisfaction techniques.

BACKGROUND OF THE INVENTION

Many of the tasks that are addressed by decision-making systems and artificial intelligence can be represented as constraint satisfaction problems (CSPs). In this representation, the task is specified in terms of a set of variables, each of which can assume values in a given domain, and a set of constraints that the variables must simultaneously satisfy. The set of variables, domains and constraints is referred to as a CSP. Each constraint may be expressed as a relation, defined over some subset of the variables, denoting valid combinations of their values. A solution to a CSP is an assignment of a value to each variable from its domain that satisfies all of the constraints. Various techniques have been proposed for solving CSPs. A survey of common techniques can be found in a paper by Kumar entitled "Algorithms for Constraint Satisfaction Problems: A Survey," Artificial Intelligence Magazine, 13:1 (1992), pages 32-44, which is incorporated herein by reference.

Constraint satisfaction methods have been found useful in a variety of applications, including:
Artificial intelligence
Robotic control
Temporal reasoning
Natural language parsing
Spatial reasoning
Test-case generation for software and hardware systems
Machine vision
Medical diagnosis
Resource allocation
Crew scheduling
Time tabling
Frequency allocation
Graph coloring.

For example, Bin et al. describe a constraint satisfaction method for use in automated generation of test programs, in a paper entitled "Using a Constraint Satisfaction Formulation and Solution Techniques for Random Test Program Generation," *IBM Systems Journal* 41:3 (2002), pages 386-402, which is incorporated herein by reference. The authors show how random test program generation can be modeled as a CSP, and they describe a set of solution techniques that are used in practical test-case generation tools. Adir et al. in a paper entitled "Piparazzi: A Test Program Generator for Micro-architecture Flow Verification," Eighth IEEE International High-Level Design Validation and Test Workshop (Nov. 12-14, 2003), pages 23-28, which is incorporated herein by reference, describe a test generator that uses a dedicated CSP solver. The test generator converts user requests for micro-architectural events into test programs.

A number of other constraint satisfaction systems are described in the patent literature. For example, U.S. Pat. No. 5,636,328, whose disclosure is incorporated herein by reference, describes methods and apparatus for finding values that satisfy a set of constraints, applied particularly to control of a robotic arm. U.S. Pat. No. 5,617,510, whose disclosure is also incorporated herein by reference, describes a method, useful in computer-aided design, of identifying possible solutions to an over-constrained system having a collection of entities and constraints.

The concept of a CSP was generalized by Mittal et al. to cover more complex problems, in which variables may be active or inactive, in a paper entitled "Dynamic Constraint Satisfaction Problems," Proceedings of the Eighth National Conference on Artificial Intelligence (AAAI-90), Boston, Mass., July 1990, pages 25-32, which is incorporated herein by reference. To avoid ambiguity, this generalization is commonly referred to as "Conditional CSP," or CondCSP. A CondCSP comprises the following:

A set of variables $V=\{v_1, v_2, \ldots, v_n\}$.
A set of domains $D=\{D_1, D_2, \ldots, D_n\}$, such that $D_i$ is the set of valid values for the variable $v_i$.
A set of initial variables $V_I \subseteq V$, $V_I \neq \phi$.
A set of compatibility constraints $C_C$.
A set of activity constraints $C_A$.

In contrast to the traditional definition of CSP, a variable in a CondCSP can be either active or inactive. A variable is assigned a value only if it is active. A compatibility constraint specifies the set of allowed combinations of values for a set of variables. A compatibility constraint is active only if all its variables are active. An activity constraint has the form $c_{act} \rightarrow v$, in which c is defined in the same manner as a compatibility constraint, and v is a variable. Such an activity constraint states that if the left hand constraint c holds, then the variable v is active. Similarly, $c_{rn} \rightarrow v$ (wherein rn stands for "require not") states that the variable v is not active if constraint c holds.

A Solution to a CondCSP contains (a) a set of active variables that must include all initial variables, and (b) a value assignment to all the active variables, in which each variable is assigned a value from its domain, the assignment satisfying all the active compatibility constraints. The assignment and the set of active variables must satisfy all the activity constraints.

SUMMARY OF THE INVENTION

The CondCSP framework described hereinabove has distinct limitations when large portions of the problem are conditional. In such cases, the set of constraints becomes large and complicated, increasing the probability of introducing modeling errors.

Automatic generation of test programs is a particularly difficult application for CSP or CondCSP. Test program generation, when represented as a CondCSP, has several unique characteristics. Bin et al. analyze the special properties of automatic test generation applications in the paper referenced hereinabove. There is, therefore, particularly strong motivation for devising methods for the compact modeling of highly complex automatic test generation problems.

Embodiments of the present invention provide an extension of the CondCSP representation scheme, which includes a method for representing conditional constraints that remain meaningful even when some of the variables they refer to are inactive. The method, to be hereafter referred to as "extended conditional constraint satisfaction problem," or ECondCSP, enables a compact representation of highly complex problems, which in turn reduces labor and decreases the chance of modeling mistakes.

Disclosed embodiments of the present invention provide one or both of the following main elements:
1. A novel language that enables users of CSP solvers to construct ECondCSPs simply and compactly.
2. An automatic parsing method that turns ECondCSP constraints into conventional CondCSP constraints that can be solved by CSP solvers known in the art.

In other embodiments, the ECondCSP is solved directly without conversion to CondCSP.

In some embodiments, ECondCSP is used in improved modeling tools for automatic generation of test programs, but the principles of the present invention are equally applicable in other fields of application of conditional CSPs, such as the applications listed hereinabove.

There is therefore provided, in accordance with an embodiment of the present invention, a method for automatically generating test programs, including:

receiving a description of a system under test, expressed in terms of variables associated with the system and conditional constraints including semantics applied to the variables;

receiving a definition of an event to be tested in the system;

generating an ECondCSP over the variables responsively to the definition of the event and to the conditional constraints, such that at least some of the semantics of the conditional constraints are preserved in the ECondCSP when one or more of the variables to which the semantics are applied are inactive; and solving the ECondCSP to generate a test case for the system.

In a disclosed embodiment, receiving the description includes receiving a model of a processor, and generating the test case includes generating a test program for testing the processor.

In another embodiment, generating the test case includes generating an expected system behavior in response to the event and testing the system against the expected system behavior using the test case.

In yet another embodiment, solving the ECondCSP includes generating a plurality of test cases, each corresponding to one of a plurality of solutions of the ECondCSP.

In still another embodiment, solving the ECondCSP includes transforming the ECondCSP to a CondCSP, and solving the CondCSP using a CondCSP solver.

There is additionally provided, in accordance with an embodiment of the present invention, a method for modeling a system, including:

characterizing the system in terms of variables associated with the system and conditional constraints including semantics applied to the variables;

defining an ECondCSP over the variables responsively to the conditional constraints, such that at least some of the semantics of the conditional constraints are preserved in the ECondCSP when one or more of the variables to which the semantics are applied are inactive; and solving the ECondCSP so as to model an aspect of the system.

In a disclosed embodiment, the conditional constraints include atomic constraints linked by logical operators, and defining the ECondCSP includes:

accepting one or more operator semantics tables with respect to the logical operators; and parsing the conditional constraints using the operator semantics tables to generate the ECondCSP constraint.

Additionally or alternatively, accepting the one or more operator semantics tables includes accepting a list of operands of the logical operator and a corresponding definition of preserved semantics for each activity/inactivity status combination of the operands.

Further additionally or alternatively, accepting the corresponding definition of the preserved semantics includes defining at least one output of the logical operator to be returned when one or more of the operands are inactive.

In a disclosed embodiment, accepting the corresponding definition of the preserved semantics includes defining at least one of the activity/inactivity status combinations for which no semantics are preserved.

In another embodiment, parsing the conditional constraints includes parsing each of the conditional constraints into a parse-tree, and merging the parse-tree into the ECondCSP constraint.

Additionally or alternatively, parsing each of the conditional constraints includes assigning the atomic constraints to leaves of the parse-tree and assigning the logical operators to nodes of the parse-tree, so that at least one of the logical operators links lower-level constraints below the node to which the at least one of the logical operators is assigned.

Further additionally or alternatively, merging the parse-tree includes traversing the parse-tree in a depth-first order, and merging the lower-level constraints of the nodes into the ECondCSP constraint as the nodes are traversed.

Further additionally or alternatively, merging the lower-level constraints includes, at each of the nodes, generating a combined activation requirement and combined preserved semantics based on the lower-level constraints and on the operator semantics tables of the logical operators.

In yet another embodiment, merging the lower-level constraints includes generating a combined activation requirement and combined preserved semantics based on the lower-level constraints and on a default definition of the preserved semantics with respect to at least one of the logical operators.

In another embodiment, parsing each of the conditional constraints includes generating a plurality of parse-trees, and merging the parse tree includes reducing the parse-trees into a Directed Acyclic Graph (DAG), and merging the DAG, using the operator semantics tables, into the ECondCSP.

Additionally or alternatively, reducing the parse-trees includes identifying identical nodes within the parse-trees and merging the identical nodes to appear only once in the DAG.

In an embodiment, solving the ECondCSP includes transforming the ECondCSP into a CondCSP, and solving the CondCSP using a CondCSP solver.

In another embodiment, defining the ECondCSP includes defining an extended compatibility constraint, and transforming the ECondCSP includes:

adding a shadow variable for each of at least some of the variables in the ECondCSP; and converting the extended compatibility constraint into one or more CondCSP compatibility constraints using the shadow variable.

Additionally or alternatively, adding the shadow variable includes assigning a domain to the shadow variable.

Further additionally or alternatively, adding the shadow variable includes adding activity constraints for inclusion in the CondCSP compatibility constraints, specifying that each variable is active if its corresponding shadow variable is inactive, and vice versa.

In another embodiment, converting the extended compatibility constraint includes defining a plurality of activity/ inactivity truth assignments over the variables in the ECondCSP, and adding a respective CondCSP constraint to the CondCSP for each of the activity/inactivity truth assignments.

In a disclosed embodiment, the system has a structure and one or more inputs, and the one or more of the variables describe the structure and the inputs to the system, and solving the ECondCSP includes finding values of the variables so as to determine the inputs to be made to the system.

Additionally or alternatively, finding the values of the variables includes generating input values so as to test the system.

In another embodiment, the system includes a mechanical system, and one or more of the variables correspond to control parameters of the mechanical system, and solving the ECondCSP includes generating a command to control the mechanical system based on values of the one or more of the variables.

In yet another embodiment, one or more of the variables correspond to features of an image containing visual information, and solving the ECondCSP includes identifying an object in the image based on the features.

In still another embodiment, one or more of the variables correspond to a natural language input, and solving the ECondCSP includes parsing the natural language, responsively to values of the one or more of the variables, so as to interpret the language.

In another disclosed embodiment, one or more of the variables correspond to characteristics of a condition, and solving the ECondCSP includes determining a diagnosis of the condition based on values of the one or more of the variables.

In another embodiment, one or more of the variables correspond to characteristics of resources whose use is to be scheduled, and solving the ECondCSP includes scheduling the use of the resources responsively to values of the one or more of the variables.

It is also provided, in accordance with an embodiment of the present invention, apparatus for automatically generating test programs, including a test generator, which is adapted to receive a description of a system under test, expressed in terms of variables associated with the system and conditional constraints including semantics applied to the variables, to receive a definition of an event to be tested in the system, to generate an ECondCSP over the variables responsively to the definition of the event and to the conditional constraints, such that at least some of the semantics of the conditional constraints are preserved in the ECondCSP when one or more of the variables to which the semantics are applied are inactive, and to solve the ECondCSP to generate a test case for the system.

There is additionally provided, in accordance with an embodiment of the present invention, apparatus for modeling a system, including a Constraint Satisfaction Problem (CSP) processing module, which is adapted to characterize the system in terms of variables associated with the system and conditional constraints including semantics applied to the variables, to define an ECondCSP over the variables responsively to the conditional constraints, such that at least some of the semantics of the conditional constraints are preserved in the ECondCSP when one or more of the variables to which the semantics are applied are inactive, and to solve the ECondCSP so as to model an aspect of the system.

There is also provided, in accordance with an embodiment of the present invention, a computer software product for automatically generating test programs, the product including a computer-readable medium in which program instructions are stored, which instructions, when read by a computer, cause the computer to receive a description of a system under test, expressed in terms of variables associated with the system and conditional constraints including semantics applied to the variables, to receive a definition of an event to be tested in the system, to generate an ECondCSP over the variables responsively to the definition of the event and to the conditional constraints, such that at least some of the semantics of the conditional constraints are preserved in the ECondCSP when one or more of the variables to which the semantics are applied are inactive, and to solve the ECondCSP to generate a test case for the system.

There is additionally provided, in accordance with an embodiment of the present invention, a computer software product for modeling a system, the product including a computer-readable medium in which program instructions are stored, which instructions, when read by a computer, cause the computer to characterize the system in terms of variables associated with the system and conditional constraints including semantics applied to the variables, to define an ECondCSP over the variables responsively to the conditional constraints, such that at least some of the semantics of the conditional constraints are preserved in the ECondCSP when one or more of the variables to which the semantics are applied are inactive, and to solve the ECondCSP so as to model an aspect of the system.

The present invention will be more fully understood from the following detailed description of the embodiments thereof, taken together with the drawings in which:

DETAILED DESCRIPTION OF EMBODIMENTS

Definition of Extended Conditional CSP

Figure 1:
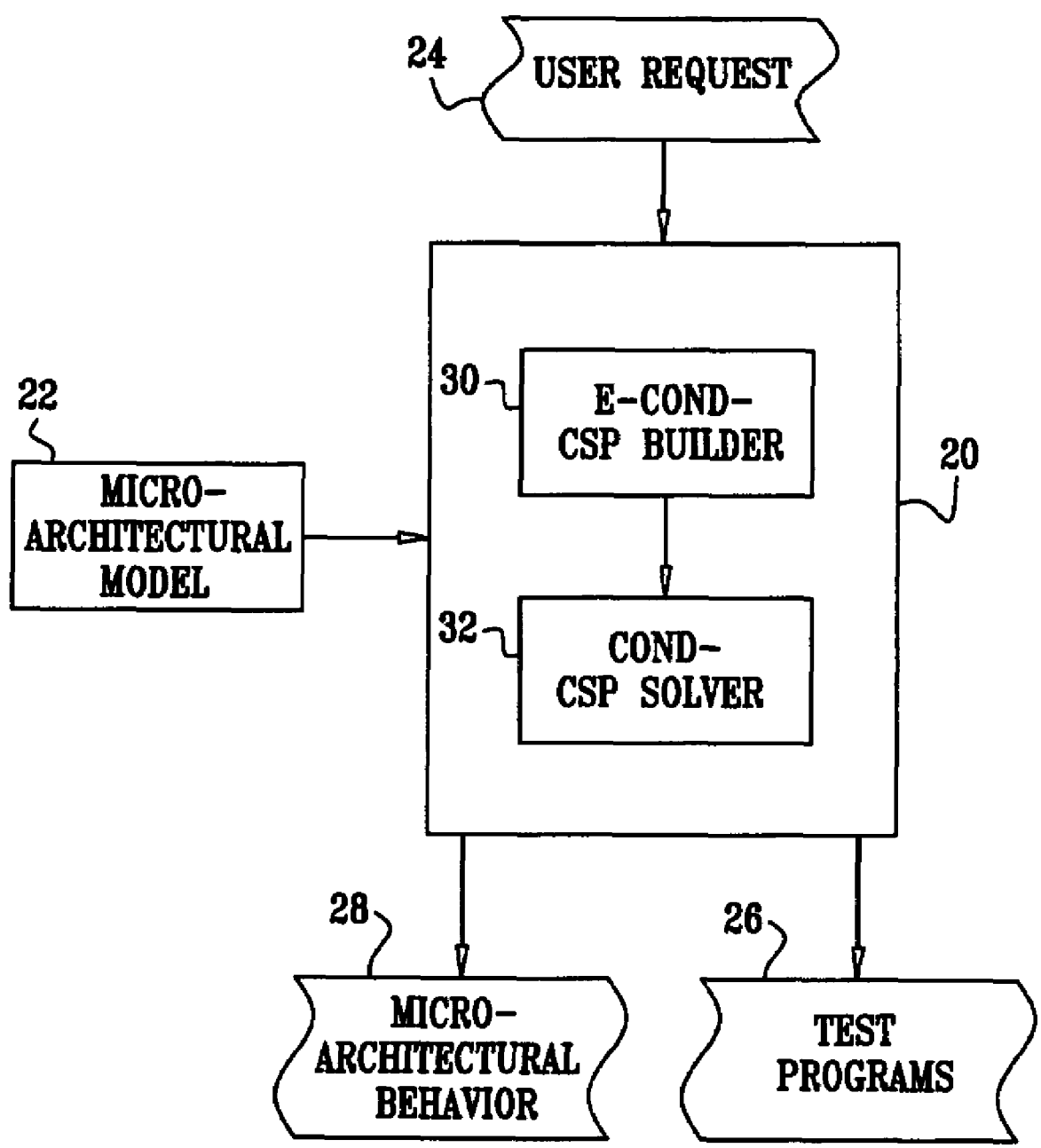
FIG. 1 is a schematic block diagram of apparatus for automatic test program generation, in accordance with an embodiment of the present invention.

The traditional definition of a CondCSP comprises variables, domains, compatibility constraints and activity constraints. According to this definition, a compatibility constraint is active if and only if all its variables are active. Embodiments of the present invention define a representation framework referred to as "Extended Conditional CSP," or ECondCSP. The definition of ECondCSP expands the definition of compatibility constraints. In ECondCSP, compatibility constraints may preserve some of their semantics even if some of their variables are inactive.

The following example illustrates the concept of "preserved semantics." Consider the variables a, b, c, and d, and the constraint "(a=b)∨(c=d)." Each of the four variables a . . . d can be either active or inactive. In conventional CondCSP semantics, if one of the four variables is inactive, the entire constraint is discarded. Nevertheless, it is sometimes desirable to keep a part of the constraint even when some of its variables are inactive. Assume, for example, that variable c or variable d is inactive. It may still be desired to maintain the constraint "a=b" in solving the underlying CSP.

The only way to model this requirement as a CondCSP using semantics known in the art would be to write a series of relatively complex constraints, such as the three constraints that follow. Here $\underline{c}$ denotes that variable c is inactive:

(a=b)∨(c=d): This constraint would take effect when all four variables are active.

($\underline{c}$∨$\underline{d}$)→(a=b)≡(a≠b)$_{act}$→c, d: Here we require that when either c or d is inactive, the "a=b" side of the constraint must hold.

($\underline{a}$∨$\underline{b}$)→(c=d)≡(c≠d)$_{act}$→a, b: Similarly, we require that when either a or b is inactive, the "c=d" side of the constraint still holds.

In the embodiments of the present invention that are described hereinbelow, an extended compatibility constraint comprises the following:

A set of variables, identical to the CondCSP format.

"Activation requirements," which identify the subsets of variables that must be active in order for the constraint to be preserved.

"Preserved semantics": how is the constraint defined for each subset of active variables.

More formally, a constraint in an ECondCSP is a vector of pairs of the form (activation requirements, preserved semantics), wherein:

"Activation requirements" is a binary expression over the activity/inactivity status of the variables involved in the constraint.

"Preserved semantics" is a constraint over the variables defined to be active in the corresponding activation requirements, such as the requirement "a=b" when c or d is inactive in the example given above.

In addition, in the embodiments described below, the following convention is used: The first element of the constraint vector states that all the variables involved in the constraint are active. Additionally, the following requirement is fulfilled: The set of activation requirements for a given constraint is disjoint. In other words, if the activation requirements of one element in the vector are evaluated to "true," the activation requirements of all the other elements must evaluate to "false." Subject to this requirement, a constraint in an ECondCSP is satisfied when either (a) none of the activation requirements hold, whereby the constraint is trivially satisfied, or (b) one of the activation requirements holds, and its corresponding preserved semantics are satisfied. Alternative ECondCSP representations will be apparent to those skilled in the art upon reading the present patent application and are considered to be within the scope of the present invention.

System Description

FIG. 1 is a block diagram that schematically illustrates apparatus for automatic test program generation, in accordance with an embodiment of the present invention. A test generator 20 generates a set of test programs as part of a verification plan for a microprocessor or other computing device, to be hereafter referred to as DUT ("design under test"). The test generator receives as input a micro-architectural model 22 of the DUT, which includes models of different hardware building blocks and mechanisms of the DUT (e.g., pipe stages and queues) and the logical connections between them. A user request 24 describes the micro-architectural events that require testing. For example, an event for testing may comprise two instructions at specific pipe stages that generate simultaneous exceptions.

Test generator 20 comprises a CSP processing module, which comprises an ECondCSP builder 30 and a CondCSP solver 32, whose functions are described below in detail. Both micro-architectural model 22 and user request 24 are converted to an Extended Conditional Constraint-Satisfaction Problem (ECondCSP), as described by the methods disclosed hereinbelow. ECondCSP builder 30 generates the ECondCSP, representing the micro-architectural model of the DUT and the user request as a set of variables and constraints. The modeling language used by ECondCSP builder 30 generates constraints that describe the various building blocks and mechanisms of the DUT, as well as relationships between attributes of these building blocks.

The ECondCSP builder then transforms the ECondCSP into an equivalent CondCSP. Methods for generating and transforming the ECondCSP are described hereinbelow. CondCSP solver 32 solves this model and generates a set of random test programs 26 that cover the events required for testing, and a micro-architectural behavior 28, describing the expected DUT behavior under these tests.

The inventors have implemented an automatic test-program generator, based on an embodiment of the present invention, in the Piparazzi test generator described in the article by Adir et al. cited hereinabove. Piparazzi uses an embodiment of the disclosed ECondCSP builder as a modeling tool for building complex microprocessor models and test-cases that include activation requirements on some of the variables. Piparazzi then solves the resulting ECondCSP to produce a set of random test programs that are applied to the tested DUT. Further aspects of automatic test generation using CSP solutions are described in Great Britain Patent Application GB0407260.9, which is incorporated herein by reference.

Although the embodiments described herein relate specifically to automatic test-program generation, the principles of the present invention may be applied in modeling a wide range of other types of target systems in terms of constraint satisfaction problems. The ECondCSP builder that is embodied in test generator 20 may be adapted, either in the configuration of a stand-alone computer or integrated with other input and output devices, to generate ECondCSPs that describe substantially any problem that can be expressed in terms of a complex conditional constraint satisfaction problem. Some examples of such applications are listed in the Background of the Invention. Exemplary applications include controlling a robot based on sensor inputs; analyzing visual or spatial information to identify and characterize objects in an image; parsing natural language input to interpret its meaning; suggesting medical diagnoses based on symptoms and test results; determining resource allocations and scheduling; temporal reasoning; graph problems; and design of floor plans, circuits and machines. Other applications will be apparent to those skilled in the art.

Typically, test generator 20 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, test generator 20 may be implemented in dedicated hardware logic, or using a combination of hardware and software elements. Further alternatively, test generator 20 may be implemented using a single computing platform or its functions may be distributed among multiple computing platforms.

Figure 2:
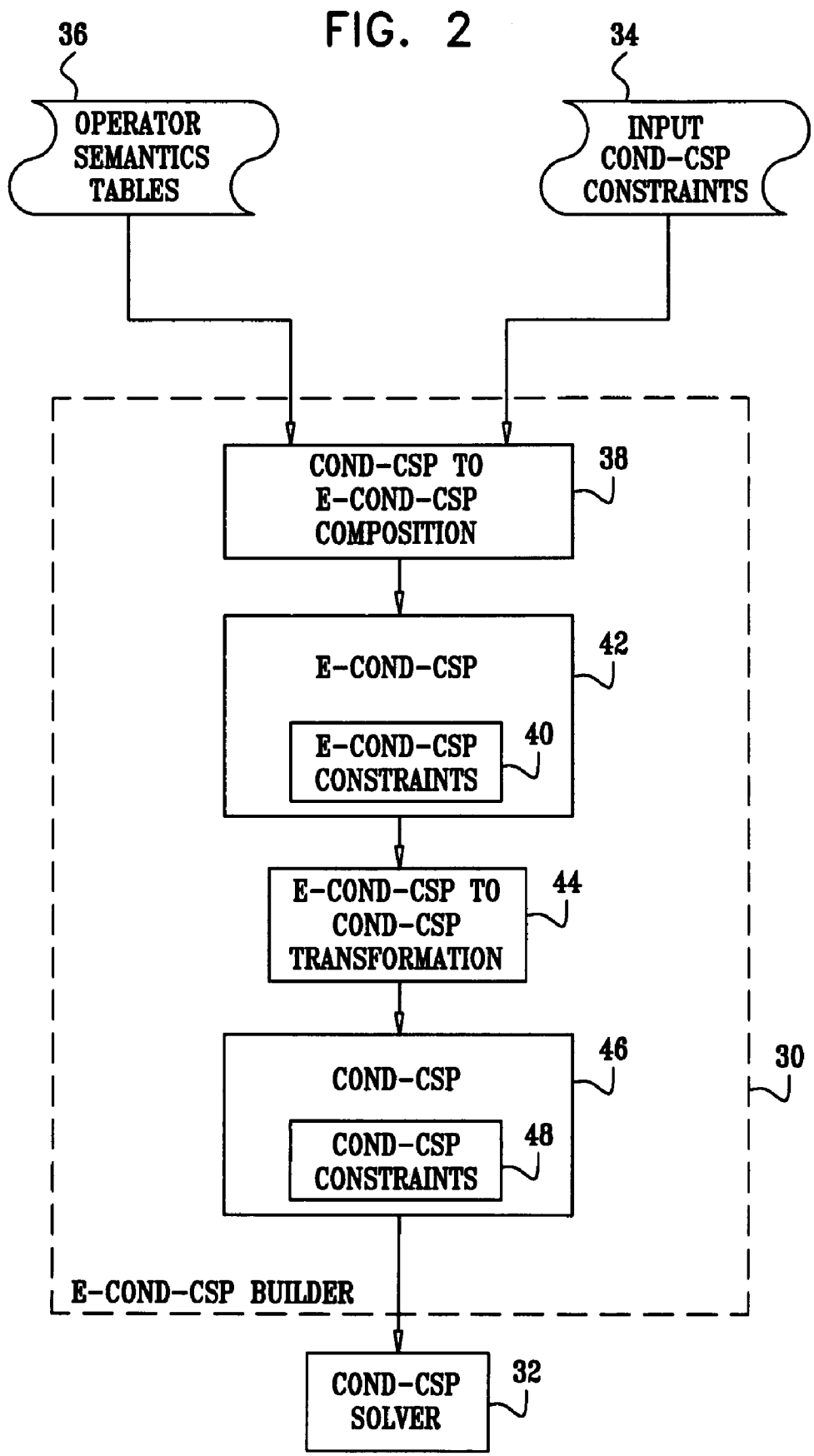
FIG. 2 is a flow-chart that schematically illustrates a method for building and solving an ECondCSP, in accordance with embodiments of the present invention.

FIG. 2 is a flow chart that schematically illustrates a method for building and solving an ECondCSP, in accordance with embodiments of the present invention. The method is implemented in ECondCSP builder 30, shown in FIG. 1.

A first disclosed method provides a means for a human CSP modeler to construct complex constraints by linking atomic CondCSP constraints using operators such as "and," "or" and "implies." An atomic constraint is the simplest form of constraint, which cannot be divided into simpler expressions. In a disclosed embodiment, atomic constraints may be represented using truth tables that cover all possible assignments of the input variables. In other embodiments atomic constraints may be represented using explicit expressions, such as "a>b+c+1." The human modeler inputs a set of CondCSP compatibility constraints 34, typically given in the form of predicates over variables. Operator semantics tables (OSTs) 36 define, for each operator, how lower-level constraints are merged into more complex ECondCSP constraints, while preserving some of their semantics even if some of the variables are inactive. The concept of operator semantics tables is described in detail hereinbelow. ECondCSP builder 30 uses a composition method 38 to compose input CondCSP compatibility constraints 34 into complex ECondCSP constraints 40, which are part of a complete ECondCSP 42. Composition method 38 is further detailed in the explanation of FIG. 4 hereinbelow.

A second disclosed method provides a transformation of ECondCSP 42, comprising ECondCSP constraints 40, using a transformation method 44, into a CondCSP 46, with an associated set of CondCSP constraints 48. Transformation method 44 allows compact modeling of highly-complex conditional CSPs. In addition, transformation method 44 enables the use of existing CondCSP solving tools, as are known in the art, for solving ECondCSPs. Transformation method 44 is further detailed in the explanation of FIG. 3 hereinbelow.

Figure 3:
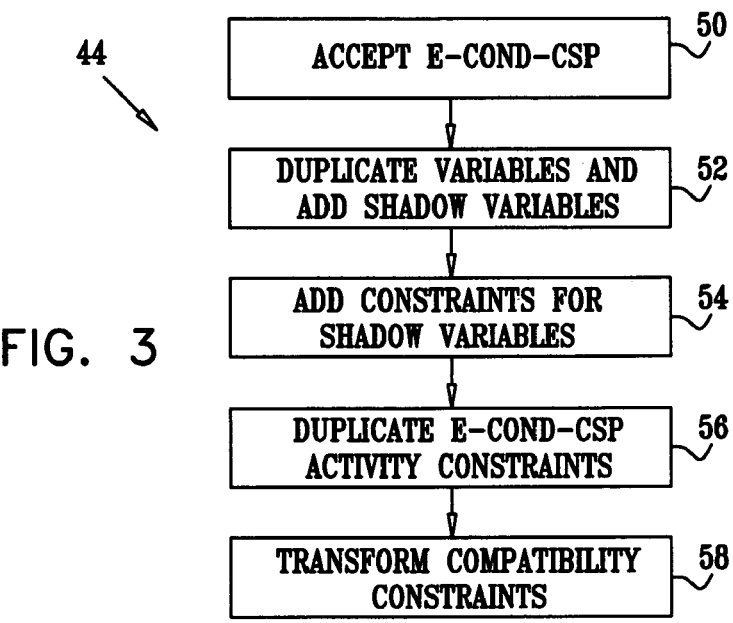
FIG. 3 is a flow-chart that schematically illustrates a method for transforming ECondCSPs into CondCSP formulation, in accordance with an embodiment of the present invention.

FIG. 3 is a flow chart that schematically shows details of transformation method 44, in accordance with an embodiment of the present invention. As noted above, method 44 converts a given ECondCSP into CondCSP format, so that a conventional CondCSP solver may process and solve it. The method is initiated when ECondCSP builder 30 accepts an ECondCSP at a problem input step 50. As described hereinabove, the ECondCSP is expressed in terms of variables, variable domains and extended constraints. ECondCSP builder 30 maintains all variables that appear in the original ECondCSP along with their original domains.

In addition, for each variable v in the ECondCSP, a shadow variable $\bar{v}$ is added to the CondCSP at a variable addition step 52. The domain for all shadow variables is the set $\{0\}$. Thus, the set of variables in the CondCSP is twice as large as the variable set of the ECondCSP, comprising all original ECondCSP variables plus a set of shadow variables. The relationship between each variable and its respective shadow variable is that one is active if and only if the other is inactive. The ECondCSP builder establishes this relationship by adding two activity constraints to the composed CondCSP at a constraint adding step 54. These constraints are:

$\bar{v}_{rn} \rightarrow v$
$v_{rn} \rightarrow \bar{v}$

The activity constraints of the ECondCSP remain unchanged in the composed CondCSP, and the ECondCSP builder duplicates them at an activity constraint duplication step 56.

The ECondCSP builder then continues to transform the compatibility constraints at a compatibility constraint construction step 58. Let c denote a compatibility constraint of the original ECondCSP. The method loops over all possible truth assignments of the activity/inactivity status of all variables that appear in constraint c. For each truth assignment A, the ECondCSP builder transforms c as follows:

1. If A does not satisfy any of the activation requirements of c, do nothing.
2. If A satisfies an activation requirement of c with corresponding preserved semantics S:
   Let $\{v_1, v_2, \ldots, v_n\}$ denote the set of inactive variables in A.
   Add the following constraint to the composed CondCSP:
   $S \wedge (\bar{v}_1 = 0) \wedge (\bar{v}_2 = 0) \wedge \ldots \wedge (\bar{v}_n = 0)$, wherein $\wedge$ denotes the logical "and" operator.

This added constraint is active only when all the variables affected by S (typically the variables required to be active according to the activation requirement corresponding to S), are indeed active. In addition, because of the use of the $\bar{v}$ (shadow) variables, the new constraint can only be active when the variables required to be inactive are indeed in that state.

The method terminates once all compatibility constraints have been transformed into respective CondCSP constraints.

The following example illustrates transformation method 44 disclosed above. Consider an ECondCSP comprising two variables, a and b, both having the domain $\{0, 1, \ldots, 10\}$. The problem comprises a single constraint defined by the following table:

|   | Activation requirement | Preserved semantics |
|---|---|---|
| 1 | $a_a \wedge b_a$ | $(a = 1) \rightarrow (b = 2)$ |
| 2 | $a_a \wedge b_{na}$ | $a \neq 1$ |

($v_a$ denotes that variable v is active, while $v_{na}$ denotes that variable v is inactive.) The disclosed method produces a CondCSP comprising the four variables a, b, $\bar{a}$ and $\bar{b}$ along with the following constraints:

| Constraint | Explanation |
|---|---|
| $\bar{a}_{rn} \rightarrow a$ | Avoid mutual activation of a and $\bar{a}$ |
| $a_{rn} \rightarrow \bar{a}$ | |
| $\bar{b}_{rn} \rightarrow b$ | Avoid mutual activation of b and $\bar{b}$ |
| $b_{rn} \rightarrow \bar{b}$ | |
| $(a = 1) \rightarrow (b = 2)$ | Translation of the first row of the constraint. Semantics remain unchanged, as all variables must be active in that row. |
| $(a \neq 1) \wedge (\bar{b} = 0)$ | Translation of the second row of the constraint. |

Figure 4:
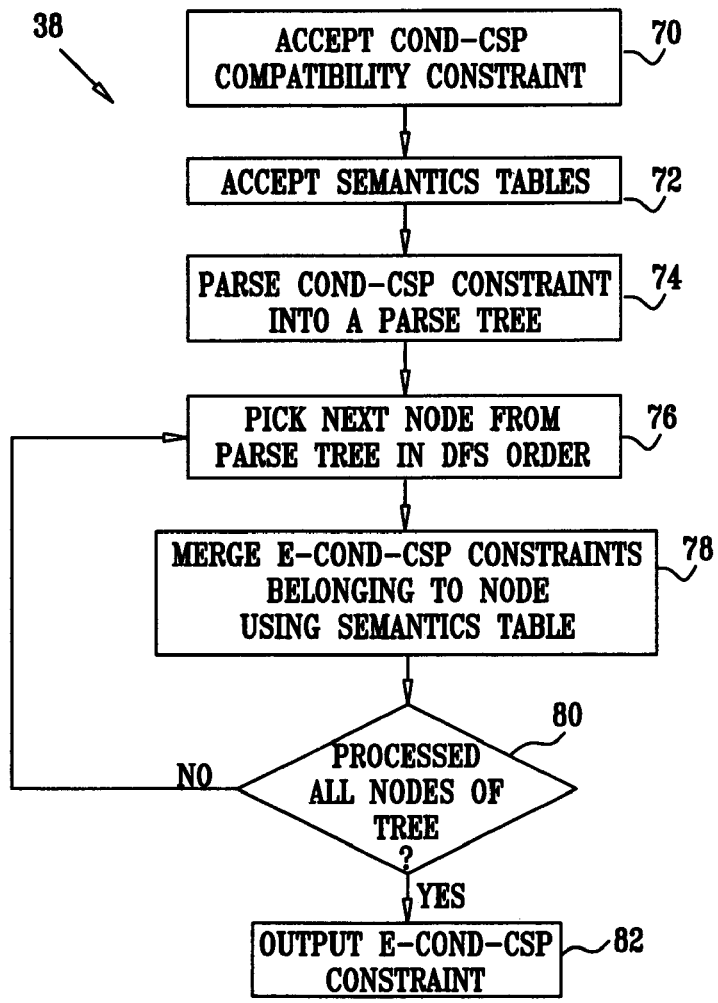
FIG. 4 is a flow-chart that schematically illustrates a method for composing ECondCSP constraints, in accordance with an embodiment of the present invention.

FIG. 4 is a flow-chart that schematically shows details of composition method 38, which may be used to compose ECondCSP constraints, in accordance with an embodiment of the present invention. The method begins when ECondCSP builder 30 accepts a CondCSP compatibility constraint, to be converted to ECondCSP, at a constraint accepting step 70. The input constraint is typically complex, comprising a number of atomic constraints that are linked by logical operators. The operators linking the atomic constraints are logical operators such as "∧" (logical "and"), "∨" (logical "or"), "¬" (logical "not") or "→" (logical "imply" operator). For example, the complex constraint (a=b)∨(c=d) comprises two atomic constraints, (a=b) and (c=d), which are linked by the ∧operator.

The ECondCSP builder further accepts as input a set of operator semantics tables (OSTs) at a table accepting step 72. One OST is input per each operator that appears in the input CondCSP constraint. The OST defines systematically how semantics of a given operator are to be preserved in the event that one or more of the operands is inactive. A set of suggested semantics tables for several common operators is given in Appendix 1 hereinbelow.

For a better understanding of the method to be described, the concept of operator semantics tables will now be explained in greater detail. ECondCSP constraints are represented as atomic constraints that are combined into complex constraints by logical operators (e.g., "or", "and" or "not"). For example, the two atomic constraints (a=b) and (c>3) may be combined into the complex constraint (a=b) ∧(c>3) using the logical "and" operator denoted by the symbol ∧. In ECondCSP each constraint is conditional, meaning any of its variables may be active or inactive. The result of the operation of a logical operator may be undefined or ambiguous, depending on the activity/inactivity status of the constraints on which it operates. OSTs are one way of defining the operation of a logical operator while taking into account the activity state of the operands.

For a logical operator having n operands, the OST contains $2^n$ rows (for example, the "and" operator has two operands, and its OST contains $2^2=4$ rows). Each row refers to a specific truth assignment of the activity/inactivity status of the n operands. Each row contains a definition of the preserved semantics for the constraint, given the specific activity/inactivity configuration. This definition may be given either as a function that produces the preserved semantics or as a statement indicating that no preserved semantics are required.

The n operands may themselves be ECondCSP constraints. Therefore, each operand can be represented as a vector of pairs of the form (activation requirement, preserved semantics). (If a certain operand is atomic, the vector comprises only a single pair.) The operator semantics table thus determines how to combine the set of pairs taken from the n lower-level constraints to produce a set of pairs for the combined constraint created by the operator.

We define the complement set of the activation requirements of a given constraint to be the set of truth assignments of activity/inactivity status of the variables affected by the constraint that are not covered by any of the activation requirements of the constraint. In other words, the complement set of a given set of activation requirements is the set of activity/inactivity truth assignments for which the constraint is inactive. For example, consider a constraint over variables a and b having two possible activation requirements: $a_a \wedge b_a$ and $a_{na} \wedge b_a$. In this case, the complement set would include the remaining two truth assignments of the activity status of a and b, namely $a_{na} \wedge b_{na}$ and $a_a \wedge b_{na}$.

Whenever a row in an operator semantics table states that a given lower-level constraint is active, composition method 38 described by FIG. 4 chooses the required preserved semantics from among the pairs (activation requirement, preserved semantics) of that constraint. When, on the other hand, the row indicates that the given lower-level constraint is inactive, composition method 38 uses only the sub-constraint complement set of the activation requirement, and ignores its preserved semantics (for the given row in the operator semantics table).

EXAMPLE I

Consider a possible semantics table of the ∧(logical "and") operator, as applied to operands (lower level constraints) $C_1$ and $C_2$:

| | $C_1$ activity | $C_2$ activity | Preserved semantics |
|---|---|---|---|
| 1 | Active | Active | Resulting_semantics($S_1$, $S_2$) = $S_1 \wedge S_2$ |
| 2 | Active | Inactive | None |
| 3 | Inactive | Active | None |
| 4 | Inactive | Inactive | None |

In this example, the semantics of the ∧operator are preserved only when both $C_1$ and $C_2$ are active. In general, as noted above, $C_1$ and $C_2$ are ECondCSP constraints themselves (although at the simplest level, these constraints may simply be atomic expressions over one or more variables). Therefore, $C_1$ and $C_2$ may have multiple possible activation requirements with corresponding preserved semantics. Row 1 of the semantics table should be interpreted as follows: For each activation requirement $AR_1$ of constraint $C_1$, with corresponding preserved semantics $S_1$, and for each activation requirement $AR_2$ of constraint $C_2$, with corresponding preserved semantics $S_2$, if ($AR_1$ AND $AR_2$!=FALSE) add the following pair of activation requirement and preserved semantics to the ECondCSP constraint of $C_1 \wedge C_2$:

Activation requirement $AR_1 \wedge AR_2$.

Preserved semantics $S_1 \wedge S_2$. This semantic expression is given by applying the function given in the "preserved semantics" column of row 1 to $S_1$ and $S_2$.

Rows 2-4 of the table state that when either $C_1$ or $C_2$ (or both) are inactive, there are no preserved semantics for the constraint.

As a clarifying example, assume the following example for evaluating the ECondCSP constraint $C_1 \wedge C_2$ wherein $C_1$ and $C_2$ are both ECondCSP constraints. In this example $C_2$ is atomic while $C_1$ is more complex, having a non-trivial vector of activation requirements and preserved semantics. Both a and b are variables with domains {1, 2, 3, . . . , 30}. The constraints, activation requirements and preserved semantics for $C_1$ and $C_2$ are given in the following table:

| C1 = (a > b)∨(a > 5) | | C2 = (b < 17) | |
|---|---|---|---|
| Activation requirement | Preserved semantics | Activation requirement | Preserved semantics |
| a, b | (a > b)∨(a > 5) | b | b < 17 |
| a, <u>b</u> | a > 5 | <u>b</u> | None |
| <u>a</u>, b | None | | |
| <u>a</u>, <u>b</u> | None | | |

In the activation requirement columns of the table above, "a" denotes variable a is active, and "<u>a</u>" denotes it is inactive. Following the procedure of example I above yields the following composite constraint:

$C_1 \wedge C_2 = [(a > b) \vee (a > 5)] \wedge (b < 17)$

| Activation requirement | Preserved semantics |
|---|---|
| a, b | $[(a > b) \vee (a > 5)] \wedge (b < 17)$ |
| a, <u>b</u> | None |
| <u>a</u>, b | None |
| <u>a</u>, <u>b</u> | None |

EXAMPLE II

The second example is more complex. The example demonstrates a case in which the OST contains a row having an inactive lower-level constraint, but still produces some preserved semantics for the resulting constraint.

Consider a possible semantics table for the ∨ (logical "or") operator, as shown in the table below. Operands (lower level constraints) are again denoted $C_1$ and $C_2$.

| | $C_1$ activity | $C_2$ activity | Preserved semantics |
|---|---|---|---|
| 1 | Active | Active | Resulting_semantics($S_1$, $S_2$) = $S_1 \vee S_2$ |
| 2 | Active | Inactive | Resulting_semantics($S_1$) = $S_1$ |
| 3 | Inactive | Active | Resulting_semantics($S_2$) = $S_2$ |
| 4 | Inactive | Inactive | None |

Row 1 of the operator semantics table is calculated in a manner similar to the previous example. For each activation requirement $AR_1$ of $C_1$, with corresponding preserved semantics $S_1$, and for each activation requirement $AR_2$ of $C_2$, with corresponding preserved semantics $S_2$, if $AR_1$ and $AR_2$ are consistent, add the following pair of activation requirement and preserved semantics to the ECondCSP constraint of $C_1 \vee C_2$:

Activation requirement $AR_1 \wedge AR_2$.
Preserved semantics $S_1 \vee S_2$.

Row 2 of the operator semantics table, on the other hand, requires a different calculation. For each activation requirement $AR_1$ of $C_1$, with corresponding preserved semantics $S_1$, and for each activation requirement $AR_2$ of the complement set of $C_2$, if $AR_1$ and $AR_2$ are consistent add the following pair of activation requirement and preserved semantics to the ECondCSP constraint of $C_1 \vee C_2$:

Activation requirement $AR_1 \wedge AR_2$.
Preserved semantics $S_1$.

Row 3 is calculated similarly to row 2. The idea behind this type of calculation is that in the case of row 1, when both operands (lower-level constraints) are active, the preserved semantics of the composed constraint is simply the disjunction of the preserved semantics of the two operands. However, according to the semantics table, the composed constraint is still active even when one of its operands is inactive. In other words, even if $C_2$ is inactive, the constraint $C_1$ still has to be maintained and its semantics preserved for the next level, and vice versa. This result is different from methods of CondCSP solution known in the art, in which only row 1 would be applied, while the situations of rows 2 and 3 would result in null semantics.

Figure 5:
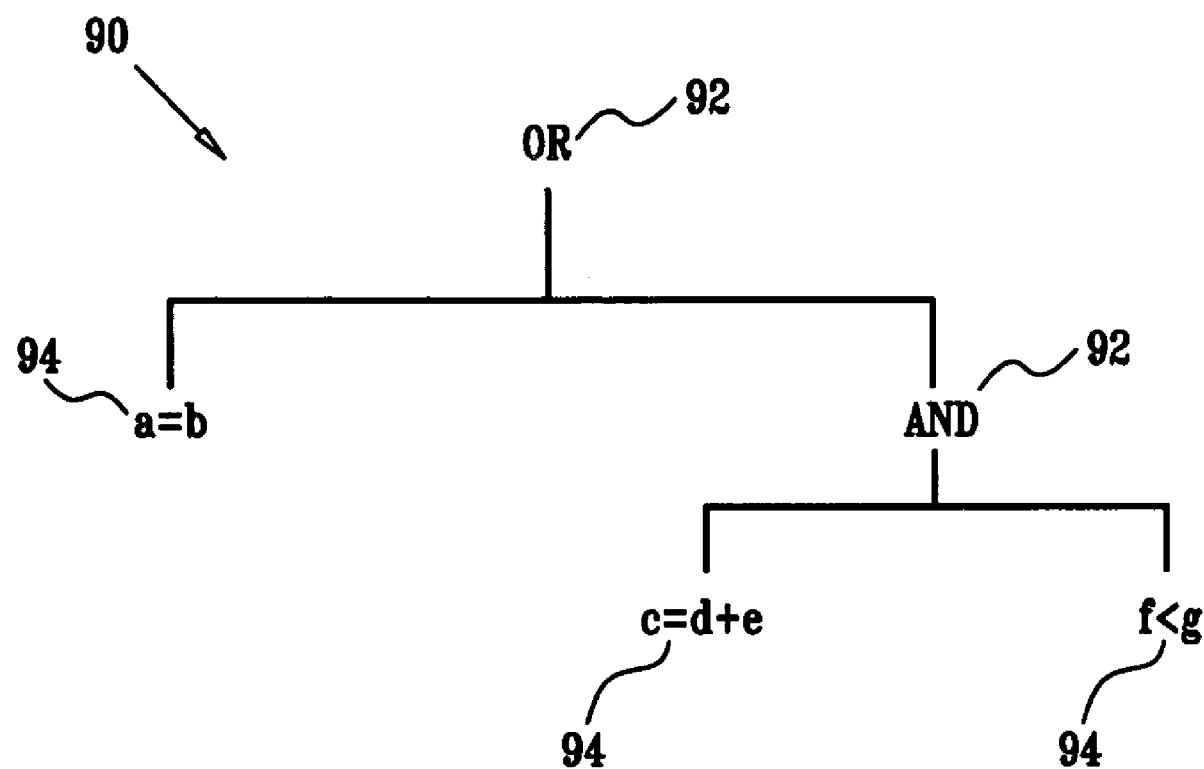
FIG. 5 is a schematic diagram that illustrates a CondCSP constraint parse-tree, in accordance with an embodiment of the present invention.

Reference is now made to FIG. 5, which is a schematic diagram that illustrates a constraint expression parse-tree 90, in accordance with an embodiment of the present invention. The ECondCSP builder parses the input constraint into parse trees of this sort at a parsing step 74 (FIG. 4). A parse tree represents a complex constraint as a tree, wherein each leaf of the tree contains an atomic constraint, and each node of the tree contains a logical operator, which links the lower-level branches extending from the node. In the example shown in FIG. 5, the complex constraint $(a=b) \vee ((c=d+e) \wedge (f<g))$ is parsed into the binary tree 90 comprising two nodes 92 and three leaves 94 containing atomic constraints.

ECondCSP builder 30 traverses the parse tree in a depth-first search (DFS) order, beginning at a node selecting step 76. DFS is a commonly-known technique for traversing trees, in which the nodes are traversed recursively, visiting the leaves first, and gradually progressing up the tree to nodes that are closer to its root. For each node that is visited at step 76, the ECondCSP builder merges the constraints belonging to the visited node into a single, complex ECondCSP constraint at a merging step 78. For this purpose, the ECondCSP builder uses the operator semantics table of the operator associated with the visited node, as described in detail hereinabove. The ECondCSP builder transforms leaves 94 in the parse-tree, which are atomic constraints, into ECondCSP constraints having a single activation requirement stating that all the variables are active, and a single corresponding element of preserved semantics, which is the original semantics of the atomic constraint itself.

In an alternative embodiment, the ECondCSP builder may merge nodes by following simpler default definitions, rather than using the full operator semantics table. For example, a logical "and" operator, linking several constraints, can be defined as being active if and only if all of its lower level constraints are active. These default definitions may be represented either as truth tables or as explicit rules, and may be used for some or all of the operators in a given CSP.

The ECondCSP builder checks whether the entire parse tree has been merged at a checking step 80. If there are remaining nodes for merging, the method returns to node selecting step 76 and continues the DFS traversal of the parse tree. Once the entire tree has been processed, meaning that all low-level constraints have been merged into a single constraint, the ECondCSP builder outputs the resulting ECondCSP constraint at a termination step 82. A formal description of composition method 38 is given in Appendix 2 hereinbelow.

ECondCSPs typically contain many constraints, each represented by a parse-tree as described hereinabove. In a disclosed embodiment, the set of parse trees may be partially merged to create a Directed Acyclic Graph (DAG) by identifying identical nodes. This merging allows for better performance of the CondCSP solver, as it is not required to resolve identical constraints more than once. The DAG configuration also improves computation time and memory requirements of the CondCSP solver.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

Appendix 1: Semantics Tables for Common Operators

The inventors have found the following semantics tables useful for modeling complex conditional constraint satisfaction problems. Alternative semantic tables will be apparent Logical "and" ($C_1 \wedge C_2$):

| | $C_1$ activity | $C_2$ activity | Preserved semantics |
|---|---|---|---|
| 1 | Active | Active | Resulting_semantics($S_1$, $S_2$) = $S_1 \wedge S_2$ |
| 2 | Active | Inactive | None |
| 3 | Inactive | Active | None |
| 4 | Inactive | Inactive | None |

Logical "or" ($C_1 \vee C_2$):

| | $C_1$ activity | $C_2$ activity | Preserved semantics |
|---|---|---|---|
| 1 | Active | Active | Resulting_semantics($S_1$, $S_2$) = $S_1 \vee S_2$ |
| 2 | Active | Inactive | Resulting_semantics($S_1$) = $S_1$ |
| 3 | Inactive | Active | Resulting_semantics($S_2$) = $S_2$ |
| 4 | Inactive | Inactive | None |

Logical "not" ($\neg C$):

| | C activity | Preserved semantics |
|---|---|---|
| 1 | Active | Resulting_semantics(S) = $\neg S$ |
| 2 | Inactive | None |

Logical "imply" ($C_1 \rightarrow C_2$)

| | $C_1$ activity | $C_2$ activity | Preserved semantics |
|---|---|---|---|
| 1 | Active | Active | Resulting_semantics($S_1$, $S_2$) = $S_1 \rightarrow S_2$ |
| 2 | Active | Inactive | Resulting_semantics($S_1$) = $\neg S_1$ |
| 3 | Inactive | Active | None |
| 4 | Inactive | Inactive | None |

Appendix 2: Composition Method—Formal Description

The following appendix comprises a formal description of composition method 38, as described in detail in FIG. 3 hereinabove. Given an expression e, and a set of operators Op={$op_1$, $op_2$, ..., $op_n$} (each operator having a corresponding semantics table $op_i$.st), parse the expression e into a parse tree. Each internal node contains an operator from the set Op. The leaves of the tree contain atomic constraints. At this point, call the recursive procedure compose (root, ECondCSP_constraint). The output of the method is the value of ECondCSP_constraint when the procedure "compose" terminates.

Procedure "compose," listed below, accepts one input, of type "node." It produces one output, "constraint," which is a vector of rs_pairs, each having the form (activation-requirement, semantics). "activation-requirement" is a Boolean expression over activity/inactivity status, and "semantics" is an expression that provides the preserved semantics for its corresponding activation requirement.

For the sake of simplicity, the procedure is shown for unary and binary operators. The procedure can be easily expanded to support n-ary operators, in which n>2.

The following definitions are used in the method description below:

AR(C): The ordered set of activation requirements for a given ECondCSP constraint C. This set is a projection of the vector of pairs (activation-requirement, semantics) onto a single vector—one that contains only the activation requirement.

$\overline{AR(C)}$: The ordered set of the complement set of activation requirements for a given ECondCSP constraint C.

S(C): The ordered set of preserved semantics for a given ECondCSP constraint C. This set is a projection of the vector of pairs (activation-requirement, semantics) onto a single vector—one that contains only the preserved semantics.

$\otimes$: The ordered Cartesian product operator. Given two ordered sets, a and b, $a \otimes b$ (which may also be written as $\otimes (a, b)$) produces the Cartesian product of a and b, ordered according to the lexicographic order of the position in a and then the position in b.

$\otimes_f$: The ordered Cartesian product function operator. Given two ordered sets, a and b, and a function f, $a \otimes_f b$ (which may also be written as $\otimes_f (a, b)$) produces an ordered set that is the result of activating f on each of the elements of the ordered set $a \otimes b$. The operator may be extended, in a similar manner, to any number of operands.

For example, consider a case in which f is the conjunction operator $\wedge$, $a=(a_1, a_2, \ldots, a_n)$, and $b=(b_1, b_2, \ldots, b_n)$. In this example, $a \otimes_\wedge b$ produces the ordered set $(a_1 \wedge b_1, a_2 \wedge b_2, \ldots, a_n \wedge b_n)$.

The same operator can be used for any number of vectors as arguments. For a single vector, f would be activated on all the elements in the vector. For two arguments a and b, f would be activated on the Cartesian product of a and b. For three arguments a, b, and c, f would be activated on the Cartesian product of a, b, and c, and so forth.

∘: The ordered pairing operator. Given two ordered sets $a=(a_1, a_2, \ldots, a_n)$ and $b=(b_1, b_2, \ldots, b_n)$ with an identical number of elements, $a \circ b=((a_1, b_1), (a_2, b_2), \ldots, (a_n, b_n))$. The same operator may also use as arguments an ordered set $a=(a_1, a_2, \ldots, a_n)$ and a single element x. In this case, $a \circ x=((a_1, x), (a_2, x), \ldots, (a_n, x))$.

×: The ordered set multiplication operator. Given an ordered set $a=(a_1, a_2, \ldots, a_n)$ and an integer m, it duplicates each element in the set m times, such that:

$$a \times m = (\overbrace{a_1, a_1, \ldots, a_1}^{m}, \overbrace{a_2, a_2, \ldots a_2}^{m}, \ldots, \overbrace{a_n, a_n, \ldots, a_n}^{m})$$

and $$m \times a = (\overbrace{a_1, a_2, \ldots, a_n}^{1st\ duplication}, \overbrace{a_1, a_2, \ldots a_n}^{2nd\ duplication}, \ldots, \overbrace{a_1, a_2, \ldots, a_n}^{m\text{-}th\ duplication})$$

|a|: For an ordered set a, this operator returns the number of elements in a.

"Compose" Pseudocode Listing

```
Compose(
    node: input;
    constraint: output)
{
    // Stop condition - atomic CondCSP constraints:
    // All variables are required, the only
    // semantics is the original expression.
``` if expression is an atomic constraint:
rs_pair:=(The conjunction of the existence variables of all the variables of the constraint, the constraint)

```
            constraint := { rs_pair }
            return
            // extract the operator from the node
op := node.get_operator( )
// now extract the semantics table from the operator
ts := op.ts
if (op is an unary operator)
    // recursively call "compose" for the sub-constraint
    // of this node
    sub_node := the single sub-constraint of this node
    compose(sub_node, sub_constraint)
    // There are only two rows in the semantics
    // table of "op"
    f := ts[active]. preserved_semantics_function
    if (f != 'none')
 constraint.append(
    AR(sub_constraint) ∘[⊗_f(S(sub_constraint))])
        f := ts[inactive]. preserved_semantics_function
        if (f != 'none')
            constraint.append(AR(sub_constraint) ∘f( ))
if (op is a binary operator)
    // recursively call "compose" for the sub-constraint
    // of this node
    sub_node_l := the left sub-constraint of this node
    compose(sub_node_l, sub_constraint_l)
    sub_node_r := the left sub-constraint of this node
    compose(sub_node_r, sub_constraint_r)
    // There are exactly four rows in the
    // semantics table of "op"
    f := ts[active,active].preserved_semantics_function
    if (f != 'none')
        constraint.append(
            [AR(sub_constraint_l) ⊗∧AR(sub_constraint_r)]∘
            )
            [S(sub_constraint_l) ⊗_f S(sub_constraint_r)]
    f := ts[active,inactive].preserved_semantics_function
    if (f != 'none')
        constraint.append(
            [AR(sub_constraint_l) ⊗∧AR(sub_constraint_r)]∘
            )
            [⊗_f(S(sub_constraint_l))× | AR(sub_constraint_r) |]
    f := ts[inactive,active].preserved_semantics_function
    if (f != 'none')
        constraint.append(
            [AR(sub_constraint_l) ⊗∧AR(sub_constraint_r)]∘
            )
            [| AR(sub_constraint_l) | × ⊗_f (S(sub_constraint_r))]
    f :=
        ts[inactive,inactive].preserved_semantics_function
        if (f != 'none')
            constraint.append(
                [AR(sub_constraint_l) ⊗∧AR(sub_constraint_r)]∘
                )
            ⊗_f( )
}
```

The invention claimed is:

1. A method for automatically generating test programs, comprising:
receiving a description of a system under test, expressed in terms of variables associated with the system and conditional constraints comprising semantics applied to the variables;
receiving a definition of an event to be tested in the system;
generating an ECondCSP over the variables responsively to the definition of the event and to the conditional constraints, such that at least some of the semantics of the conditional constraints are preserved in the ECondCSP when one or more of the variables to which the semantics are applied are inactive; and
solving the ECondCSP to generate a test case for the system.

2. A method for modeling a system, comprising:
characterizing the system in terms of variables associated with the system and conditional constraints comprising semantics applied to the variables;
defining an ECondCSP over the variables responsively to the conditional constraints, such that at least some of the semantics of the conditional constraints are preserved in the ECondCSP when one or more of the variables to which the semantics are applied are inactive; and
solving the ECondCSP so as to model an aspect of the system.

3. The method according to claim 2, wherein the conditional constraints comprise atomic constraints linked by logical operators, and wherein defining the ECondCSP comprises:
accepting one or more operator semantics tables with respect to the logical operators; and
parsing the conditional constraints using the operator semantics tables to generate the ECondCSP constraint.

4. The method according to claim 3, wherein accepting the one or more operator semantics tables comprises accepting a list of operands of the logical operator and a corresponding definition of preserved semantics for each activity/inactivity status combination of the operands.

5. The method according to claim 3, wherein parsing the conditional constraints comprises parsing each of the conditional constraints into a parse-tree, and merging the parse-tree into the ECondCSP constraint.

6. The method according to claim 2, wherein solving the ECondCSP comprises transforming the ECondCSP into a CondCSP, and solving the CondCSP using a CondCSP solver.

7. The method according to claim 2, wherein the system has a structure and one or more inputs, and the one or more of the variables describe the structure and the inputs to the system, and wherein solving the ECondCSP comprises finding values of the variables so as to determine the inputs to be made to the system.

8. The method according to claim 2, wherein the system comprises a mechanical system, and one or more of the variables correspond to control parameters of the mechanical system, and wherein solving the ECondCSP comprises generating a command to control the mechanical system based on values of the one or more of the variables.

9. The method according to claim 2, wherein one or more of the variables correspond to features of an image containing visual information, and wherein solving the ECondCSP comprises identifying an object in the image based on the features.

10. The method according to claim 2, wherein one or more of the variables correspond to a natural language input, and wherein solving the ECondCSP comprises parsing the natural language, responsively to values of the one or more of the variables, so as to interpret the language.

11. The method according to claim 2, wherein one or more of the variables correspond to characteristics of a condition, and wherein solving the ECondCSP comprises determining a diagnosis of the condition based on values of the one or more of the variables.

12. The method according to claim 2, wherein one or more of the variables correspond to characteristics of resources whose use is to be scheduled, and wherein solving the ECondCSP comprises scheduling the use of the resources responsively to values of the one or more of the variables.

13. Apparatus for automatically generating test programs, comprising a test generator, a description of a system under test, expressed in terms of variables associated with the system and conditional constraints comprising semantics applied to the variables, to receive a definition of an event to be tested in the system, to generate an ECondCSP over the variables responsively to the definition of the event and to the conditional constraints, such that at least some of the semantics of the conditional constraints are preserved in the ECondCSP when one or more of the variables to which the semantics are applied are inactive, and to solve the ECondCSP to generate a test case for the system.

14. The apparatus according to claim 13, wherein the test generator receives receive a model of a processor and generates a test program for testing the processor.

15. The apparatus according to claim 13, wherein the test generator generates an expected system behavior in response to the event, whereby the system is tested against the expected system behavior using the test case.

16. The apparatus according to claim 13, wherein the test generator generates a plurality of test cases, each corresponding to one of a plurality of solutions of the ECondCSP.

17. The apparatus according to claim 13, wherein the test generator transforms the ECondCSP to a CondCSP, and comprises a CondCSP solver, which solves the CondCSP.

18. Apparatus for modeling a system, comprising a Constraint Satisfaction Problem (CSP) processing module, which characterizes the system in terms of variables associated with the system and conditional constraints comprising semantics applied to the variables, to define an ECondCSP over the variables responsively to the conditional constraints, such that at least some of the semantics of the conditional constraints are preserved in the ECondCSP when one or more of the variables to which the semantics are applied are inactive, and to solve the ECondCSP so as to model an aspect of the system.

19. The apparatus according to claim 18, wherein the conditional constraints comprise atomic constraints linked by logical operators, and wherein the CSP processing module accepts one or more operator semantics tables with respect to the logical operators, and to parse the conditional constraints using the operator semantics tables to generate the ECondCSP constraint.

20. The apparatus according to claim 19, wherein the CSP processing module accepts a list of operands of the logical operator and a corresponding definition of preserved semantics for each activity/inactivity status combination of the operands.

21. The apparatus according to claim 20, wherein the CSP processing module defines at least one output of the logical operator to be returned when one or more of the operands are inactive.

22. The apparatus according to claim 20, wherein the CSP processing module defines at least one of the activity/inactivity status combinations for which no semantics are preserved.

23. The apparatus according to claim 19, wherein the CSP processing module parses each of the conditional constraints into a parse-tree, and merges the parse-tree into the ECondCSP constraint.

24. The apparatus according to claim 23, wherein the CSP processing module assigns the atomic constraints to leaves of the parse-tree and assign the logical operators to nodes of the parse-tree, so that at least one of the logical operators links lower-level constraints below the node to which the at least one of the logical operators is assigned.

25. The apparatus according to claim 24, wherein the CSP processing module traverses the parse-tree in a depth-first order and merges the lower-level constraints of the nodes into the ECondCSP constraint as the nodes are traversed.

26. The apparatus according to claim 25, wherein the CSP processing module generates, at each of the nodes, a combined activation requirement and combined preserved semantics based on the lower-level constraints and on the operator semantics tables of the logical operators.

27. The apparatus according to claim 25, wherein the CSP processing module generates a combined activation requirement and combined preserved semantics based on the lower-level constraints and on a default definition of the preserved semantics with respect to at least one of the logical operators.

28. The apparatus according to claim 23, wherein the CSP processing module generates a plurality of parse-trees, to reduce the parse-trees into a Directed Acyclic Graph (DAG), and to merge the DAG, using the operator semantics tables, into the ECondCSP.

29. The apparatus according to claim 28, wherein the CSP processing module identifies identical nodes within the parse-trees and merges the identical nodes to appear only once in the DAG.

30. The apparatus according to claim 18, wherein the CSP processing module transforms the ECondCSP into a CondCSP, and comprises a CSP solver, which solves the CondCSP.

31. The apparatus according to claim 30, wherein the CSP processing module defines an extended compatibility constraint, to add a shadow variable for each of at least some of the variables in the ECondCSP, and to convert the extended compatibility constraint into one or more CondCSP compatibility constraints using the shadow variable.

32. The apparatus according to claim 31, wherein the CSP processing module assigns a domain to the shadow variable.

33. The apparatus according to claim 31, wherein the CSP processing module adds activity constraints for inclusion in the CondCSP compatibility constraints, specifying that each variable is active if its corresponding shadow variable is inactive, and vice versa.

34. The apparatus according to claim 30, wherein the CSP processing module defines a plurality of activity/inactivity truth assignments over the variables in the ECondCSP, and to add a respective CondCSP constraint to the CondCSP for each of the activity/inactivity truth assignments.

35. A computer software product for automatically generating test programs, the product comprising a computer-readable medium in which program instructions are stored, which instructions, when read by a computer, cause the computer to receive a description of a system under test, expressed in terms of variables associated with the system and conditional constraints comprising semantics applied to the variables, to receive a definition of an event to be tested in the system, to generate an ECondCSP over the variables responsively to the definition of the event and to the conditional constraints, such that at least some of the semantics of the conditional constraints are preserved in the ECondCSP when one or more of the variables to which the semantics are applied are inactive, and to solve the ECondCSP to generate a test case for the system.

36. A computer software product for modeling a system, the product comprising a computer-readable medium in which program instructions are stored, which instructions, when read by a computer, cause the computer to characterize the system in terms of variables associated with the system and conditional constraints comprising semantics applied to the variables, to define an ECondCSP over the variables responsively to the conditional constraints, such that at least some of the semantics of the conditional constraints are preserved in the ECondCSP when one or more of the variables to which the semantics are applied are inactive, and to solve the ECondCSP so as to model an aspect of the system.

37. The product according to claim 36, wherein the conditional constraints comprise atomic constraints linked by logical operators, and wherein the instructions cause the computer to accept one or more operator semantics tables with respect to the logical operators, and to parse the conditional constraints using the operator semantics tables to generate the ECondCSP constraint.

38. The product according to claim 37, wherein the instructions cause the computer to accept a list of operands of the logical operator and a corresponding definition of preserved semantics for each activity/inactivity status combination of the operands.

39. The product according to claim 37, wherein the instructions cause the computer to parse each of the conditional constraints into a parse-tree, and to merge the parse-tree into the ECondCSP constraint.

40. The product according to claim 36, wherein the instructions cause the computer to transform the ECondCSP into a CondCSP, and comprising a CSP solver, which solves the CondCSP.

* * * * *